United States Patent Office 3,516,715
Patented June 23, 1970

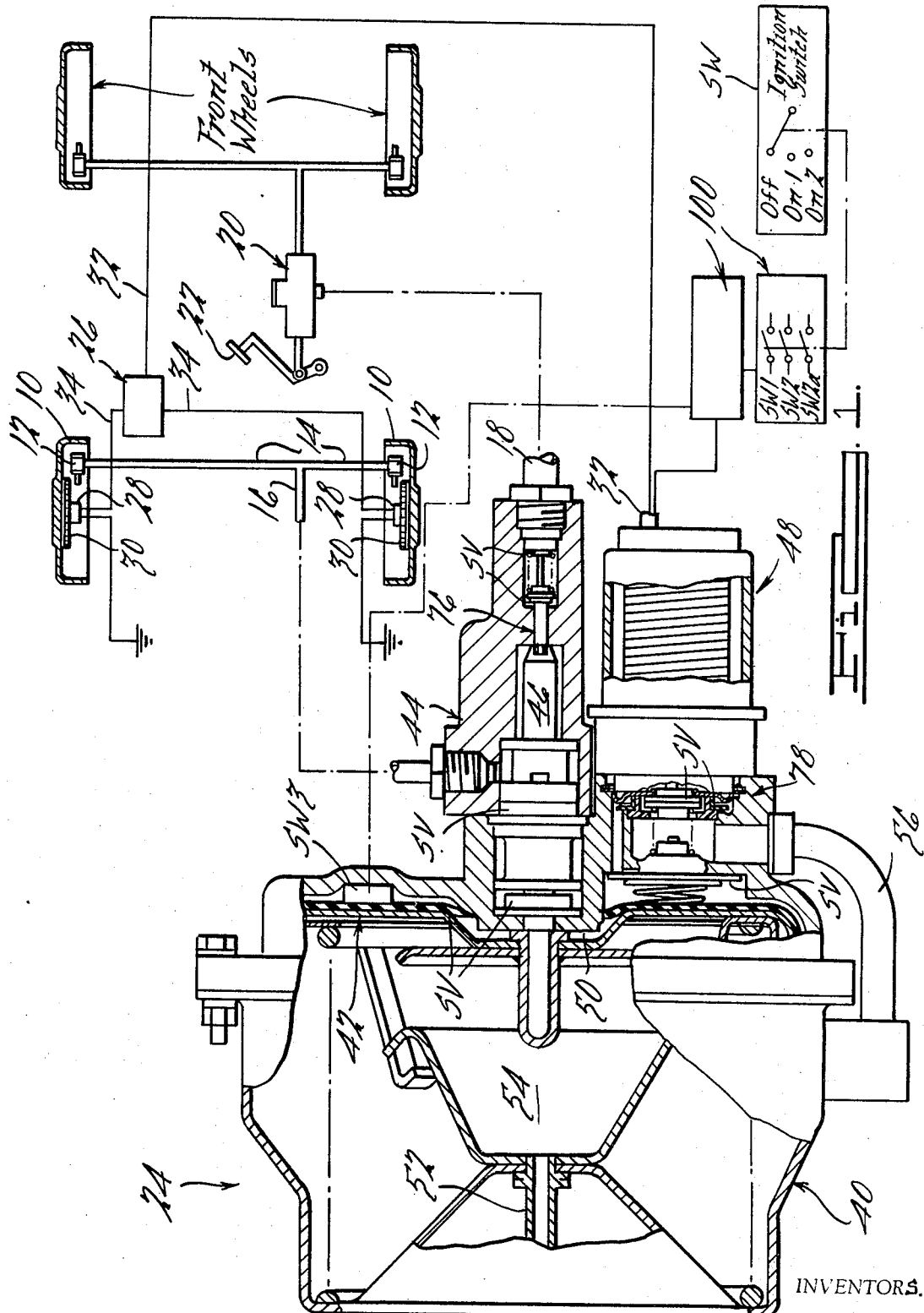

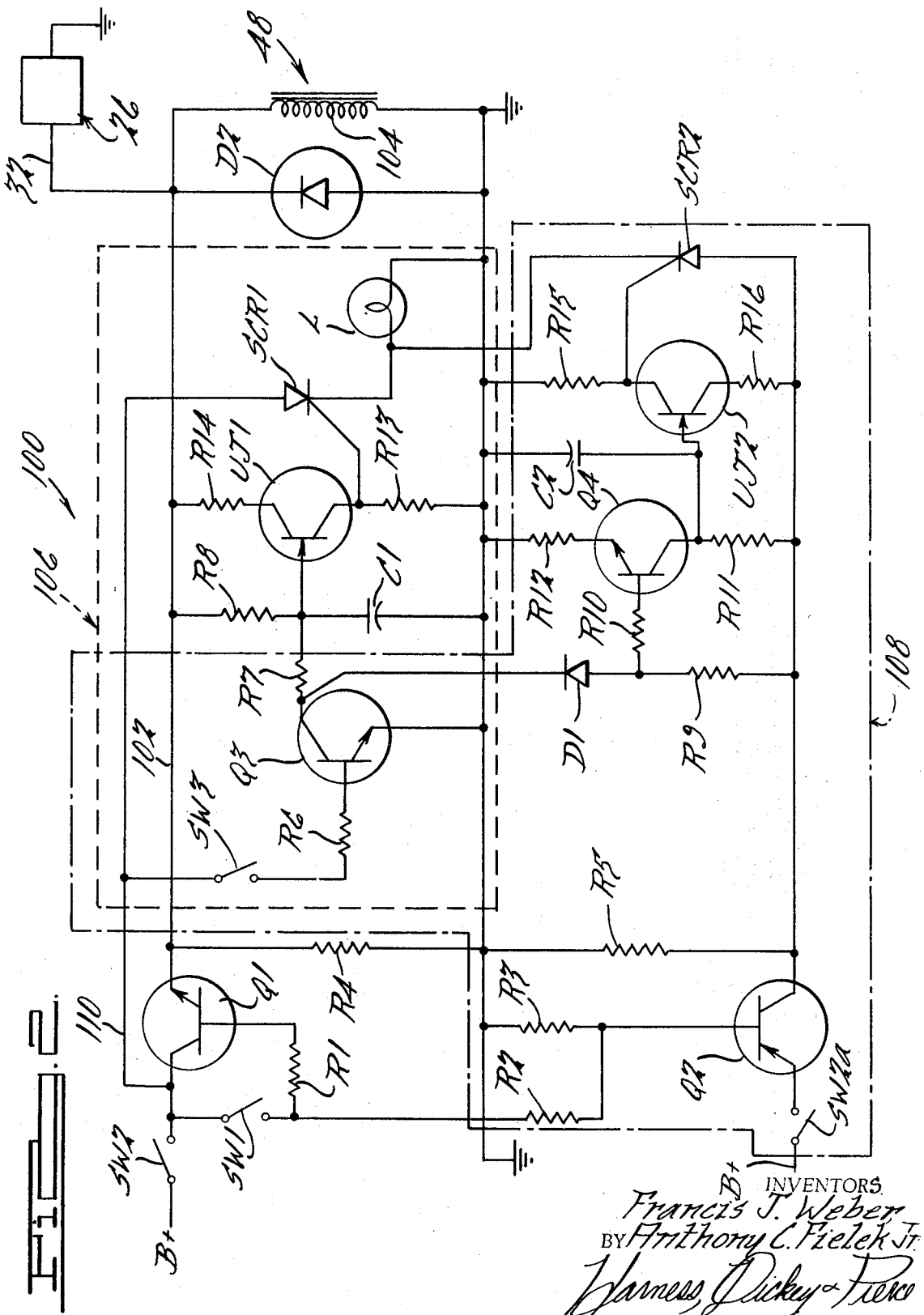

3,516,715
SKID CONTROL SYSTEM INCLUDING VALVE CYCLING AND CHECKING CIRCUIT
Anthony C. Fielek, Jr., Dearborn, and Francis J. Weber, Southfield, Mich., assignors to Kelsey-Hayes Company, Romulus, Mich., a corporation of Delaware
Continuation of application Ser. No. 647,001, June 19, 1967. This application June 20, 1969, Ser. No. 838,030
Int. Cl. B60t 8/08, 17/22
U.S. Cl. 303—21
23 Claims

ABSTRACT OF THE DISCLOSURE

A skid control system having a modulating valve and including apparatus for automatically cycling the valve independently of a skid control function in order to prevent deterioration of the valve from inaction and for checking the cycle of the valve in order to determine valve malfunction.

SUMMARY BACKGROUND OF THE INVENTION

This application is a continuation of Ser. No. 647,001 filed June 19, 1967, now abandoned.

The present invention relates to skid control systems, and more particularly relates to a circuit for cycling and checking the valve of the system.

In a skid control system using fluid actuated brakes, the brake pressure is controlled by a modulating valve located in the fluid line to the brake; the modulating valve will include fluid seals and in the system to be described includes flexible valve members. It is anticipated that such a valve would be actuated infrequently; however, it is important for proper functioning of the seals and flexible valves that they be periodically worked or flexed; experience has shown that seals and valves which are infrequently used lose their effectiveness while those that are periodically worked maintain their effectiveness. In the present invention the modulating valve will through normal vehicle use be automatically cycled whereby the seals and flexible valves will be worked and maintained effective.

It is an object of the present invention to provide, for a skid control system including a valve, a circuit for automatically cycling the valve.

It is another object of the present invention to provide, for the control valve used in a skid control system, a circuit for checking the valve.

It is another object of the present invention to provide, for a skid control system for fluid actuated brakes for wheels of a wheeled vehicle including a control valve for controlling the pressure to the brakes, a circuit for automatically cycling the valve for each actuation of the ignition switch of the vehicle.

Other objects, features, and advantages of the present invention will become apparent from the subsequent description and the appended claims, taken in conjunction with the accompanying drawing in which:

FIG. 1 is a generally schematic diagram of a skid control system including the valve cycling and checking circuit of the present invention; and FIG. 2 is a schematic diagram of the valve cycling and checking circuit of the present invention.

The valve cycling and checking circuit of the present invention can be utilized and will be described specifically for use with a skid control system for an automotive vehicle; however, it should be understood that the features of the invention could be utilized with other types of wheeled vehicles including aircraft. The skid control system generally shown in FIG. 1 can be of the type specifically shown and described in the co-pending patent application to Peter Every and William Stelzer filed July 10, 1969, Ser. No. 842,825 and the subject matter of that application is incorporated herein by reference. The skid control system of FIG. 1 can be utilized in connection either with the front wheels, the rear wheels or the front and rear wheels and will be described for use in conjunction only with the rear wheels of an automotive vehicle.

Looking now to FIG. 1, the schematic diagram generally shows the skid control system for use with the rear wheels of an automatic vehicle with the rear wheels being equipped with brake drums 10 and wheel brake cylinders 12. Hydraulic lines 14 are connected to the cylinders 12 and to a common fluid line 16 which is pressurized by a master cylinder assembly 20 via a line 18. The master cylinder assembly 20 can be of a conventional construction and actuated through a foot pedal 22. The fluid pressure from master cylinder 20 can be modulated by means of a modulating valve 24 which is connected between the fluid lines 18 and 16, and hence the modulating valve 24 can control the fluid pressure to the wheel brake cylinders 12 and hence can control the operation of the brakes. The brakes associated with the brake drum 10 can be of a conventional construction and hence the details thereof have been omitted for the purposes of simplicity.

The modulating valve 24 is actuated in accordance with an electrical signal obtained from an electrical control module 26. As will be seen the modulating valve 24 includes numerous hydraulic seals and flexible valve members; in order to maintain the effectiveness of these seals and members the valve 24 should be cycled more often than the number of times a skid condition is encountered. A circuit 100 is connected with valve 24 and will automatically cycle the valve generally each time the vehicle with which the valve 24 is associated is employed. As will be seen in the preferred form, the valve is cycled in response to actuation of the ignition switch; however, the valve could be cycled by actuation of some other device as long as the other device was actuated automatically by the operator, for example, in operating (preparing to operate, etc.) the vehicle.

The control module 26 receives information from sensors 28 associated with each of the brake drums 10 by means of exciter rings 30. The exciter rings 30 and sensors 28 can be of constructions known in the art and since the specific details thereof do not constitute a part of the present invention they have been omitted for the purposes of simplicity. The exciting rings 30 can be of a toothed construction and the sensors 28 can be of a permanent magnet or electromagnet construction which together define a variable reluctance pickup. The exciter rings 30 would be rotated with the brake drums 10 and hence with the associated wheels, and by virtue of the toothed construction, could via sensors 28 generally provide a pulsating or alternating electrical signal via conductors 34 to the module 26 which signal would be an indication of the rotational velocity of the associated wheels.

The control module 26 can be constructed to sense the rate of change in the signal at the conductors 34 and hence to sense the deceleration rate of the wheels associated with the brake drums 10 and to provide an output signal in response to the magnitude of the deceleration of the wheels associated with brake drums 10 reaching a preselected magnitude corresponding to a skid condition existing or to be occurring at the wheels associated with drums 10. The output or control signal will be transmitted by means of conductor 32 to the modulating valve 24. In the system shown, the control module 26 can provide merely an "on" or "off" signal and modulation of the fluid pressure to the brake cylinders 12 will be provided by the modulating valve 24 to control the braking of the vehicle.

In general the modulating valve 24 has a vacuum chamber housing 40 divided by a diaphragm assembly 42. A hydraulic cylinder housing 44 is mounted to the housing of the vacuum chamber housing 40 and has slidably located therein a hydraulic piston 46 which is mechanically linked to the diaphragm assembly 42. Mounted to one side of the hydraulic cylinder housing 44 is solenoid 48 whose plunger controls a valve assembly 78 which seats itself over an atmospheric air inlet port to shut off the introduction of atmospheric air pressure into one side 50 of the vacuum chamber housing 40 when no skid control is indicated. The vacuum housing chamber 40 is held at vacuum through engine (not shown) vacuum via engine vacuum line 52 which communicates to the other side 54 of the vacuum chamber 40. A conduit 56 and a normally opened vacuum port communicate the opposite side 50 to vacuum. When the control module 26 provides an output signal indicating a skid condition energization of the solenoid 48 occurs and the solenoid plunger unseats the assembly 78 from the atmospheric air inlet port allowing atmospheric air pressure to enter the opposite side 50 of the chamber housing 40. At the same time the vacuum port is closed by actuation of solenoid 48. With the differential pressure created the diaphragm assembly 42 is moved permitting the hydraulic piston 46 to move. As the piston 46 moves the available volume within the hydraulic cylinder housing 44 increases and at the same time a check valve 76 is seated cutting off any further application of master cylinder pressure to the brakes of the wheels being skid controlled. The brake cylinder pressure which has already been built up will be relieved by flowing into the increased volume created in the hydraulic cylinder housing 44 by the movement therefrom of the hydraulic piston 46. With relief of brake cylinder pressure the associated wheel can spin-up or increase in speed and the control module 26 will de-energize the solenoid allowing the plunger of solenoid 48 to return with the atmospheric air inlet port being closed again and the vacuum port to the one side 50 being opened. In this condition the piston 46 and diaphragm assembly 42 return towards their original positions. At the original position of piston 46, the check valve 76 is unseated permitting master cylinder pressure to be applied through the valve 24 directly to the brake cylinders 12.

Th modulating valve 24 includes a plurality of seals in the check valve 76 as well as the valve assembly 78 actuated by the solenoid 48 as well as the flexible portion of the diaphragm assembly 42; in addition both vacuum and hydraulic seals are provided to cooperate with the piston 46 to provide proper sealing thereof. Other valves and seals are utilized (see above noted application of Every et al.). (The seals and valves have generally been designated as SV.) It is anticipated that a skid control system, such as that shown in FIG. 1 would be actuated quite infrequently by the average driver i.e., only when a skid condition is encountered. It is known that hydraulic and pneumatic seals and valves can lose their effectiveness through prolonged inactivity and that some minimum amount of working of the valves and flexible seals is desirable in order that these members maintain their flexibility and effectiveness. Thus in FIG. 1, a valve cycling and checking circuit 100 is provided and as it will be shown, is energized in conjunction with the ignition system of the vehicle such that each time the ignition switch is actuated the modulating valve 24 will be cycled. At the same time the circuit 100 also will check the functioning of the modulating valve 24 and provide an indication to the operator of the vehicle to this effect. As will be seen, while the valve cycling is operative only in conjunction with the actuation of the ignition switch of the vehicle, the checking portion of the circuit will be effective both to the actuation of the ignition switch of the vehicle and also to the anti skid control signal provided by the module 26.

Details of the circuit 100 are shown in FIG. 2. Looking to FIG. 1 the ignition switch SW has an "off" and two "on" positions; in the "on 1" position the ignition system of the vehicle is energized; in the "on 2" position the starter motor solenoid is energized as well. With a conventional switch SW the switch is actuated by the operator to the "on 2" position until the engine of the vehicle is started at which time the switch is released by the operator and automatically returns to the "on 1" position at which the ignition is maintained energized and the starter motor solenoid is deenergized. The ignition switch SW of the vehicle can be provided with extra contacts, or present contacts can be utilized, which define switches SW1, SW2, and SW2a. Switches SW1, SW2, and SW2a will normally be opened when the ignition switch SW is off. With the ignition switch in the "on 1" position, switches SW2 and SW2a will be closed and SW1 will be open. With the ignition switch SW in the "on 2" position, switch SW1 will be closed. However, when the ignition switch SW is released to the "on 1" position, i.e., the starter motor solenoid deenergized, the switch SW1 will be opened; however, with the switch SW in the "on 1" position, the switches SW2 and SW2a will still be closed.

A transistor Q1 is of the NPN type and has its collector connected to the plus side of the battery B. The base of transistor Q1 is connected to a biasing resistor R1 which in turn is connected to the plus of battery B through the switch SW1. The emitter of the transistor Q1 has a load resistor R4 connecting it to ground and is connected via a conductor 102 to the coil 104 of the solenoid 48 which coil 104 is connected to ground. Note that the coil 104 is also connected to the conductor 32 from the control module 26 and hence will be energized by the output control signal received from the control module 26. The output control signals have a magnitude generally equal to battery potential. With the switch SW1 opened, the transistor Q1 will be nonconductive and hence the coil 104 cannot be energized by the circuit 100. When the ignition switch SW is actuated to its "on 2" position switch SW1 will be closed and the base of transistor Q1 will be connected to battery B via the biasing resistor R1 rendering the transistor Q1 conductive and energizing the coil 104. With the solenoid 48 energized actuation of the modulating valve 24 and of the diaphragm assembly 42 will occur whereby the piston 46 will be moved to its extreme, actuated position. When the ignition switch SW is released to its normal "on 1" position switch SW1 will be opened and transistor Q1 will be rendered nonconductive whereby the coil 104 will be deenergized and the diaphragm assembly 42 will be returned to its original position and the modulating valve 24 will again be in a deactuated condition. Thus the modulating valve 24 will be cycled each time the engine of the vehicle is started, and will be cycled automatically in conjunction with actuation of the ignition switch SW without requiring any additional effort by the vehicle operator. With this construction, cycling of modulating valve 24 will be assured and the seals and valves therein will be maintained operative.

It is desirable that the modulating valve 24 be checked in order to determine that it is properly functioning. The circuit 100, in addition to valve cycling, provides an indication of the proper functioning of the modulating valve 24. A first portion 106 of the circuit 100 (indicated by dotted lines) checks the initial operation of the modulating valve 24 while a second portion 108 (indicated by dot-dashed lines) checks a second portion of the operation of the modulating valve 24. The two portions 106, 108 together generally provide a check for the complete cycle of the modulating valve 24.

A valve switch SW3 is located in the opposite side 50 of the chamber housing 40 proximate to the diaphragm assembly 42. With the diaphragm assembly 42 in its deactuated or innermost position as shown in FIG. 1, the switch SW3 will be engaged thereby and will be held opened. The switch SW3 can be generally of a construction known to those skilled in the art and will be provided to be closed upon movement of the diaphragm assembly 42 a preselected distance from its innermost position. When the diaphragm assembly 42 returns to its original position, the switch SW3 will again be opened.

The switch SW3 is connected to a conductor 110 which is connected directly to the plus of battery B and to a resistor R6 which in turn is connected to the base of a transistor Q3 which is of the NPN type. The emitter of transistor Q3 is connected to ground while its collector is connected to conductor 102 via load resistor R7 and timing resistor R8. The transistor Q3 will be nonconductive with the switch SW3 opened and will be conductive when SW3 is closed. A timing capacitor C1 is connected at the juncture of resistors R7 and R8 and to ground. The emitter of a unijunction transistor UJ1 is connected to the juncture of resistors R7 and R8 and capacitor C1 while its first cathode is connected to the conductor 102 via a load resistor R14 and its second cathode is connected to ground via load resistor R13. The resistor R8 and capacitor C1 in conjunction with the unijunction UJ1 forms a first timing circuit. The unijunction UJ1 will be normally nonconductive and will be rendered conductive when the charge on capacitor C1 reaches and hence the potential at the emitter reaches a predetermined magnitude. At this point UJ1 will fire causing an increase in potential at the second cathode connected to the resistor R13. The second cathode is connected to the gate of a silicon controlled rectifier SCR1 which has its cathode connected to ground through an indicating light L. The anode of SCR1 is connected to the plus of battery B by conductor 110. The SCR1 is normally nonconductive; when the unijunction UJ1 is fired an increase in the potential at the second cathode (associated with resistor R13) will occur and the SCR1 will be gated to conduction whereby the lamp L will be lit. The timing circuit just described will begin its timing immediately upon the transistor Q1 being rendered conductive when switch SW1 is closed. The potential at the conductor 102 will then provide charge current to capacitor C1 through resistor R8. The charge time constant of the circuit is such that the unijunction UJ1, initially nonconductive, will not be rendered conductive until a selected time has elapsed indicating that the diaphragm assembly 42 of the modulating valve 24 either has not moved from its original position or was moving too slowly. In either event the valve switch SW3 will not be closed in time and the unijunction UJ1 will fire causing the SCR1 to be triggered into conduction. The SCR1 will be maintained in conduction and light L lit at least until the switch SW2 has been opened. Assuming that the modulating valve 24 is functioning properly and the diaphragm assembly 42 is actuated properly upon closure of the switch SW1, then the switch SW3 will be closed within the proper time period; the transistor Q3 will be rendered conductive dropping the potential at the emitter of the unijunction UJ1 preventing it from firing. Thus the circuit portion 106 will provide an indication as to whether or not the modulating valve 24 initially operates properly in response to energization of the valve coil 104.

Note that the conductor 32 from the module 26 is connected to the conductor 102 and hence the circuitry previously described will be operative to provide the same check of the functioning of the modulating valve 24 in response to the control signal from module 26.

The circuit portion 108 functions in a somewhat similar manner to indicate the proper return of the diaphragm assembly 42 after actuation.

The transistor Q2 is of a PNP type and on closure of switch SW2a would normally be energized. Transistor Q2 has its emitter connected to the plus of battery B through the switch SW2a and has its collector connected to a conductor 112; the emitter is also connected to ground via a load resistor R5. The base of transistor Q2 is connected to ground via biasing resistor R3 and is also connected to the juncture between switch SW1 and resistor R1 via a resistor R2. When the switch SW is in the "on 2" position SW1 is closed to energize the solenoid coil 104 (as previously noted). With switch SW1 closed, however, the base of transistor Q2 is connected to the plus of battery B via resistor R2 and Q2 is maintained nonconductive. Upon release of the ignition switch SW to the "on 1" position switch SW1 will be opened while the switch SW2a will be closed whereby transistor Q2 will conduct. Conductor 112 is connected to a control transistor Q4, of the NPN type, having its collector connected to the conductor 112 via a load resistor R11 and having its emitter connected to ground via a resistor R12. The base of the control transistor Q4 is connected to a biasing transistor R10 which in turn is connected to a resistor R9 which has one end connected to the conductor 112 and which has its other end connected to the anode of a diode D1; the cathode of diode D1 is connected to the emitter of the transistor Q3 previously described. The transistor Q4 with the transistor Q2 conducting would be rendered conductive. However, when transistor Q3 is conducting the base of Q4 is placed at a potential rendering the control transistor Q4 nonconductive. A second timing circuit includes the resistor R11 and a capacitor C2 which is connected from the resistor R11 to ground. The second timing circuit controls the firing of a unijunction transistor UJ2, which has its emitter connected at the juncture of the capacitor C2 and resistor R11. UJ2 is normally nonconductive and will be rendered conductive upon a predetermined charge being attained by the capacitor C2. The unijunction UJ2 has its first cathode connected to ground via resistor R15 and its second cathode connected to the conductor 112 via resistor R16. The first cathode, at the connection of resistor R15 is connected to the gate of a silicon control rectifier SCR2, which has its anode connected to conductor 112 and its cathode connected to lamp L. Thus when the unijunction UJ2 is rendered conductive the potential at the first cathode and R15 will be raised, raising the potential at the gate of the SCR2 rendering it conductive lighting the lamp L. The time constant of the second timing circuit including the resistor R11, capacitor C2 and unijunction UJ2 is selected such that capacitor C2 will reach the proper charge to render the unijunction UJ2 conductive in a preselected time. This preselected time is greater than the time known to be required for a normal return of the diaphragm assembly 42 to open the switch SW3. While the switch SW3 is closed the transistor Q3 will be maintained conductive maintaining the control transistor Q4 nonconductive whereby the charge current can flow through timing resistor R11 to capacitor C2; if the switch SW3 is not opened within the preselected time, the charge will be built up to fire the unijunction UJ2 resulting in the triggering of SCR2 and energization of the lamp L indicating that the valve 24 is not functioning properly. If, however, the diaphragm assembly 42 returns within the preselected time period, the valve switch SW3 will be opened rendering the transistor Q3 nonconductive. When Q3 is nonconductive, the control transistor Q4 will conduct and the potential at the emitter of the unijunction UJ2 will be dropped preventing its conduction and hence preventing the triggering of the SCR2. The circuit portion 108 will function to provide such a signal not only in conjunction with the actuation of the ignition switch SW but also by virtue of the energization of the valve coil 104 by a control signal from the control module 26 via the conductor 32.

Thus, with the apparatus as shown and described, the modulating valve 24 will be automatically cycled for each actuation of the ignition switch SW in starting the engine and in addition the circuitry 100 will monitor the operation of the modulating valve 24 and provide an indication at the lamp L of any malfunctioning of the operation of the valve 24.

A diode D2 is connected across the coil 104 to suppress high frequencies.

While it will be apparent that the preferred embodiment of the invention disclosed is well calculated to fulfill the objects above stated, it will be appreciated that the invention is susceptible to modification, variation and change without departing from the proper scope or fair meaning of the invention.

We claim:

1. In a skid control system for a wheeled vehicle including a fluid control valve controllably actuable in response to a skid control signal for controlling the pressure to the brakes of at least one wheel of the vehicle and including actuating means automatically actuable by the vehicle operator in operating the vehicle the improvement comprising valve cycling means actuable for cycling the valve without the prior occurrence of the control signal whereby the valve will be cycled at determinable times in order to prevent deterioration of the valve from inaction, said valve cycling means comprising means connected to the actuating means of the vehicle and being actuated in response to actuation of the actuating means.

2. The apparatus of claim 1 with the control valve having a determinable cycle of operation and further including valve checking means operatively connected with the control valve and responsive to a selected deviation from the determinable cycle of operation indicative of valve malfunction for providing a signal, said checking means including sensing means for sensing said selected deviation.

3. The apparatus of claim 2 with said sensing means sensing the time duration for operation of at least a selected portion of the determinable cycle and with said valve checking means providing said signal responsive to a selected deviation from said time duration.

4. The apparatus of claim 3 with the control valve being actuable and having a piston member movable to one position for relieving the fluid pressure to the brakes and to its original position for reapplying fluid pressure to the brakes and with said selected portion being at least a part of the movement of the piston member from the original position to the one position.

5. The apparatus of claim 4 with the control valve being actuable by actuation of the actuating means and with said sensing means comprising first timing means operable in response to actuation of the starting switch for initiating timing and responsive to movement of the piston member to a first selected position away from the original position for terminating timing and with said valve checking means providing said signal in response to timing by said first timing means of a preselected duration.

6. The apparatus of claim 3 with the control valve being actuable and having a piston member movable to one position for relieving the fluid pressure to the brakes and to its original position for reapplying fluid pressure to the brakes and with said selected portion being at least a part of the movement of the piston member from the one position to the original position.

7. The apparatus of claim 6 with the control valve being actuable by actuation of the starting switch to a first position in which the piston member returns to its original position from its one position and with said sensing means comprising second timing means operable in response to actuation of the actuating means to its first position for initiating timing and responsive to movement of the piston member to a second selected position away from its one position for terminating timing and with said valve checking means providing said signal in response to timing by said second timing means of a preselected duration.

8. The apparatus of claim 7 with the control valve being actuable and having a piston member movable to one position for relieving the fluid pressure to the brakes and to its original position for reapplying fluid pressure to the brakes and with said selected portion being at least a part of the movement of the piston member from the original position to the one position.

9. The apparatus of claim 8 with the control valve being actuable by actuation of the actuating means and with said sensing means comprising first timing means operable in response to actuation of the starting switch for initiating timing and responsive to movement of the piston member to a first selected position away from the original position for terminating timing and with said valve checking means providing said signal in response to timing by said first timing means of a preselected duration.

10. The apparatus of claim 9 with said sensing means comprising a switch device actuable by the piston member to one conductive condition by movement of the piston member to said first selected position and to another conductive condition by movement of the piston member to said second selected position.

11. The apparatus of claim 10 with said first and second timing means including a common controlled conduction device being in first and second conductive states in response to said switch device being in said first and second conductive conditions, respectively, and with said common device terminating timing of said first timing means when in said first conductive condition and terminating timing of said second timing means when in said second conductive condition.

12. The apparatus of claim 11 with said checking circuit means comprising an alarm means for providing an indication to the vehicle operator in response to said signal.

13. The apparatus of claim 12 with said alarm means including a light.

14. The apparatus of claim 1 with the actuating means being the ignition switch of the vehicle and having one "on" position for starting the engine of the vehicle and another "on" position for providing electrical energy to keep the engine running and with said valve cycling being actuated in response to actuation of the ignition switch to the one "on" position.

15. The apparatus of claim 14 with said valve cycling means comprising a solid state conduction device connected to the ignition switch and the control valve and having a first conductive condition for actuating the control valve and a second conductive condition for deactuating the control valve, said conduction device being in said first condition in response to the ignition switch being actuated to the one "on" position and being in said second condition in response to the ignition switch being actuated out of the one "on" position.

16. In a skid control system for a wheeled vehicle including a fluid control valve controllably actuable for controlling the pressure to brakes of at least one wheel of the vehicle with the control valve having a determinable cycle of operation the improvement comprising valve checking means operatively connected with the control valve and responsive to a selected deviation from the determinable cycle of operation indicative of valve malfunction for providing a signal, said checking means including sensing means for sensing said selected deviation.

17. The apparatus of claim 16 with the control valve being actuable by a cycling signal and having a piston member movable to one position for relieving the fluid pressure to the brakes and to its original position for reapplying fluid pressure to the brakes, said sensing means sensing the time duration for operation of at least a selected portion of the determinable cycle and with said valve checking means providing said signal responsively to a selected deviation from said time duration, said selected portion including at least a part of the movement of the piston member from the original position to the one position.

18. The apparatus of claim 17 with said sensing means comprising first timing means operable in response to said cycling signal for initiating timing and responsive to movement of the piston member to a first selected position away from the original position for terminating timing and with said valve checking means providing said signal in response to timing by said first timing means of a preselected duration.

19. The apparatus of claim 18 with said sensing means further comprising second timing means operable in response to said cycling signal for initiating timing and responsive to movement of the piston member to a second selected position away from its one position for terminating timing and with said valve checking means providing said signal in response to timing by said second timing means of a preselected duration.

20. The apparatus of claim 19 with said sensing means comprising a switch device actuable by the piston member to one conductive condition by movement of the piston member to said first selected position and to another conductive condition by movement of the piston member to said second selected position, said first and second timing means including a common controlled conduction device being in first and second conductive states in response to said switch device being in said first and second conductive conditions, respectively, and with said common device terminating timing of said first timing means when in said first conductive condition and terminating timing of said second timing means when in said second conductive condition.

21. The apparatus of claim 17 including a starting switch for the ignition of the vehicle and having one "on" position for starting the engine of the vehicle and another "on" position for providing electrical energy to keep the engine running and with said cycling signal being actuated in response to actuation of the ignition switch to the one "on" position.

22. The apparatus of claim 20 including a starting switch for the ignition of the vehicle and having one "on" position for starting the engine of the vehicle and another "on" position for providing electrical energy to keep the engine running and with the said cycling signal being actuated in response to actuation of the ignition switch to the one "on" position.

23. The apparatus of claim 1 with the brakes being hydraulically actuated and with the control valve including a plurality sealing means for providing a seal between two relatively movable members and with the actuating means being a starting switch and with the vehicle being started by actuation of the starting switch and with said valve cycling means comprising means connected to the starting switch.

References Cited
UNITED STATES PATENTS
3,265,446   8/1966   Cripe  --------------  303—21

MILTON BUCHLER, Primary Examiner

J. J. McLAUGHLIN Jr., Assistant Examiner

U.S. Cl. X.R.

303—1, 61